United States Patent
Shaaban et al.

(10) Patent No.: US 12,168,758 B1
(45) Date of Patent: Dec. 17, 2024

(54) ZINC COORDINATION ORGANOSELENIUM POLYMER FOR THE SYNTHESIS OF BIODIESEL FROM WASTE OIL

(71) Applicant: KING FAISAL UNIVERSITY, Al-Ahsa (SA)

(72) Inventors: Saad Shaaban, Al-Ahsa (SA); Ali Aqeel, Al-Ahsa (SA); Yasair Al-Faiyz, Al-Ahsa (SA); Hussein Ba-Ghazal, Al-Ahsa (SA); Ahmed A. Al-Karmalawy, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 9 days.

(21) Appl. No.: 18/435,643

(22) Filed: Feb. 7, 2024

(51) Int. Cl.
| | |
|---|---|
| *C11C 3/10* | (2006.01) |
| *B01J 31/16* | (2006.01) |
| *B01J 37/03* | (2006.01) |
| *B01J 37/04* | (2006.01) |
| *B01J 37/06* | (2006.01) |
| *B01J 37/08* | (2006.01) |
| *C07F 3/06* | (2006.01) |
| *C10L 1/18* | (2006.01) |

(52) U.S. Cl.
CPC ............ *C11C 3/10* (2013.01); *B01J 31/1691* (2013.01); *B01J 37/031* (2013.01); *B01J 37/04* (2013.01); *B01J 37/06* (2013.01); *B01J 37/08* (2013.01); *C07F 3/06* (2013.01); *C10L 1/1802* (2013.01); *B01J 2531/26* (2013.01); *C10L 2200/0476* (2013.01)

(58) Field of Classification Search
CPC ....... C11C 3/10; B01J 31/1691; B01J 37/031; B01J 37/04; B01J 37/06; B01J 37/08; B01J 2531/26; C07F 3/06; C10L 1/1802; C10L 2200/0476
See application file for complete search history.

(56) References Cited

U.S. PATENT DOCUMENTS

| | | | |
|---|---|---|---|
| 11,814,346 B1 | 6/2023 | Shabaan et al. | |
| 2008/0027096 A1* | 1/2008 | Garg | A61K 31/445 560/21 |
| 2019/0083515 A1* | 3/2019 | Cable | A61K 31/665 |

FOREIGN PATENT DOCUMENTS

| | | | | |
|---|---|---|---|---|
| CN | 102078825 B | | 12/2014 | |
| CN | 115612118 A | * | 1/2023 | |
| KR | 2013096441 A | * | 8/2013 | ......... B01J 31/1616 |

OTHER PUBLICATIONS

Faezeh Farzaneh, Faezeh Moghzi and Elnaz Rashtizadeh Zn(II) coordination polymer as a bifunctional catalyst for biodiesel production from soybean oil, DOI: https://doi.org/10.1007/s11144-016-0986-9.

Martino Di Serio, Giuseppina Carotenuto, Maria Elena Cucciolito, Matteo Lega, Francesco Ruffo, Riccardo Tesser, Marco Trifuoggi, Shiff base complexes of zinc(II) as catalysts for biodiesel production, DOI: https://doi.org/10.1016/j.molcata.2011.11.012.

Valentino Bervia Lunardi, Fransiska Gunawan, Felycia Edi Soetaredjo, Shella Permatasari Santoso, Chun-Hu Chen, Maria Yuliana, Alfin Kurniawan, Jenni Lie, Artik Elisa Angkawijaya, and Suryadi Ismadji, Efficient One-Step Conversion of a Low-Grade Vegetable Oil to Biodiesel over a Zinc Carboxylate Metal-Organic Framework, DOI: https://doi.org/10.1021/acsomega.0c03826.

Wenlei Xie, Hong Peng, and Ligong Chen, Transesterification of soybean oil catalyzed by potassium loaded on alumina as a solid-base catalyst, DOI: https://doi.org/10.1016/j.apcata.2005.10.048.

* cited by examiner

*Primary Examiner* — Latosha Hines
(74) *Attorney, Agent, or Firm* — Nath, Goldberg & Meyer; Joshua B. Goldberg

(57) ABSTRACT

A zinc coordination organoselenium polymer may be a catalyst. The zinc coordination polymer may be a catalyst for biodiesel fuel. A method of forming biodiesel from waster oil may include using the zinc coordination polymer. The waste oil may be selected from a group consisting of vegetable oil and animal fats.

18 Claims, No Drawings

ZINC COORDINATION ORGANOSELENIUM POLYMER FOR THE SYNTHESIS OF BIODIESEL FROM WASTE OIL

BACKGROUND

1. Field

The disclosure of the present patent application relates to a zinc coordination polymer and, particularly, to a zinc coordination organoselenium polymer for use as a catalyst for synthesizing biodiesel fuel.

2. Description of the Related Art

Biodiesels are typically made of monoalkyl esters of long chain fatty acids and are used as an alternative source of fuel. Biodiesel is usually obtained from renewable lipid feedstocks like vegetable oils and animal fats. Furthermore, biodiesel has gained considerable interest owing to its biodegradability, renewable characteristics, and enhanced exhaust emissions. However, biodiesels are limited by their higher cost to synthesize compared to fossil diesel.

Lipase-catalyzed transesterification of waste oil has attracted increasing attention in the biodiesel industry which in turn is a sustainable and eco-friendly strategy. Although lipases are widely used in different industries, there remain challenges of commercially available immobilized lipases suitable for biodiesel synthesis. Catalysts able to perform the transesterification of triglycerides and esterification of free fatty acids in methyl esters simultaneously are preferred from the perspective of costs.

Furthermore, heterogeneous catalysts are commonly used because of their recovery and reuse applicability at the end of the reaction. Within this context, coordination polymers have acquired increasing interest as heterogeneous catalysts owing to their potential versatility. Heterogeneous catalysts consist of micro-mesoporous hybrid structures, including metal or metal-cluster nodes connected by organic linkers to form two- or three-dimensional frameworks.

Thus, a new solution solving the above problems is desired.

SUMMARY

The present subject matter relates to a zinc coordination polymer (5) which can be synthesized in four steps. The first step includes the reduction of 4,4'-diselanediyldianiline (1) using sodium borohydride in ethanol followed by subsequent reaction with 3-bromoprop-1-ene to give the corresponding 4-(allylselanyl)aniline (2). The latter reaction with succinic anhydride in toluene affords 3-((4-(allylselanyl) phenyl)amino)-3-oxopropanoic acid (3). Zinc acetate dihydrate is dissolved in 30 mL water and then added slowly to a suspended methanolic solution of compound 3 and the reaction is refluxed for five hours, and the color changes. The solvent is then evaporated, and the solid obtained is washed with diethyl ether to give compound (4). Free radical polymerization of compound 4 using benzoyl peroxide affords the zinc coordination polymer (5).

In an embodiment, the present subject matter relates to a zinc coordination polymer having the formula I:

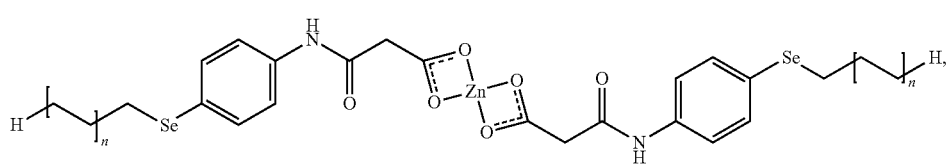

wherein n is 8.

In another embodiment, the present subject matter relates to a zinc coordination polymer that is a catalyst. The zinc coordination polymer may be a catalyst for biodiesel fuel.

In an additional embodiment, the present subject matter relates to a method of forming biodiesel from waste oil using the zinc coordination polymer of formula I. The waste oil may be selected from a group consisting of vegetable oil and animal fats.

In one more embodiment, the present subject matter relates to a method of making the zinc coordination polymer of Formula I, the method comprising: adding diselenide in ethanol to NaOH, allyl bromide, and $NaBH_4$ to obtain a first reaction mixture; stirring the first reaction mixture; removing ethanol from the first reaction mixture to obtain a first residue; dissolving the first residue in ethyl acetate and extracting the ethyl acetate with water to obtain an organic layer; removing the organic layer to obtain 4-(allylselanyl) aniline; adding toluene and maleic anhydride to the 4-(allylselanyl)aniline to obtain a second reaction mixture; removing the toluene to obtain a second residue; washing and drying the second residue with $Na_2CO_3$ to obtain 3-((4-(allylselanyl)phenyl)amino)-3-oxopropanoic acid; adding methanol to the 3-((4-(allylselanyl)phenyl)amino)-3-oxopropanoic acid to obtain a third reaction mixture; adding dissolved $Zn(CH_3COO)_2 \cdot 2H_2O$ to the third reaction mixture; heating the third reaction mixture; removing the methanol to obtain a solid; washing the solid with diethyl ether to obtain a zinc compound; dissolving the zinc compound in DMF and adding benzoyl peroxide to obtain a fourth reaction mixture; heating the fourth reaction mixture; adding cold methanol to the fourth reaction mixture to obtain a precipitate; washing the precipitate; and obtaining a zinc coordination organoselenium polymer.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a zinc coordination polymer. The zinc coordination polymer may be formed in four steps. The zinc coordination polymer may be used as a catalyst in synthesizing biodiesel fuel from waste oil. The waste oil may include vegetable oils and animal fats.

In an embodiment, the present subject matter relates to a zinc coordination polymer having the formula I:

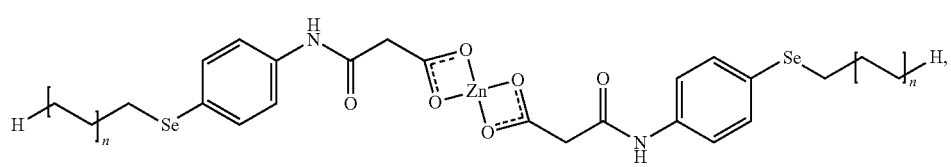

wherein n is 8.

In another embodiment, the present subject matter relates to a zinc coordination polymer that is a catalyst. The zinc coordination polymer may be a catalyst for biodiesel fuel.

In an additional embodiment, the present subject matter relates to a method of forming biodiesel from waste oil using the zinc coordination polymer of formula I. The waste oil may be selected from a group consisting of vegetable oil and animal fats.

In one more embodiment, the present subject matter relates to a method of making the zinc coordination polymer of Formula I, the method comprising: adding diselenide in ethanol to NaOH, allyl bromide, and NaBH₄ to obtain a first reaction mixture; stirring the first reaction mixture; removing ethanol from the first reaction mixture to obtain a first residue; dissolving the first residue in ethyl acetate and extracting the ethyl acetate with water to obtain an organic layer; removing the organic layer to obtain 4-(allylselanyl) aniline; adding toluene and maleic anhydride to the 4-(allylselanyl)aniline to obtain a second reaction mixture; removing the toluene to obtain a second residue; washing and drying the second residue with $Na_2CO_3$ to obtain 3-((4-(allylselanyl)phenyl)amino)-3-oxopropanoic acid; adding methanol to the 3-((4-(allylselanyl)phenyl)amino)-3-oxopropanoic acid to obtain a third reaction mixture; adding dissolved $Zn(CH_3COO)_2 \cdot 2H_2O$ to the third reaction mixture; heating the third reaction mixture; removing the methanol to obtain a solid; washing the solid with diethyl ether to obtain a zinc compound; dissolving the zinc compound in DMF and adding benzoyl peroxide to obtain a fourth reaction mixture; heating the fourth reaction mixture; adding cold methanol to the fourth reaction mixture to obtain a precipitate; washing the precipitate; and obtaining a zinc coordination organoselenium polymer.

The present production methods can be further seen by referring to the following Scheme 1:

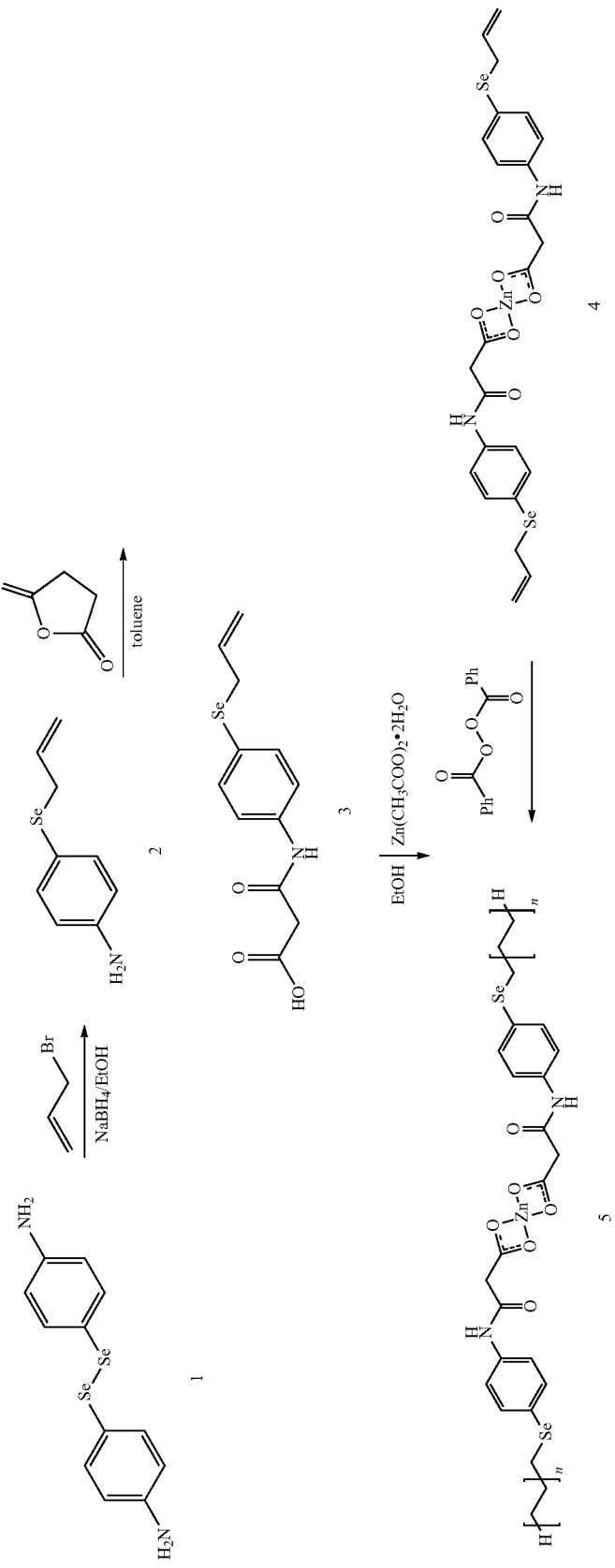

In an embodiment of the present production methods, the first reaction mixture may be stirred at room temperature.

In another embodiment of the present production methods, the first reaction mixture may be stirred for about 2 hours.

In a further embodiment of the present production methods, the ethanol may be removed under reduced pressure.

In an embodiment of the present production methods, the organic layer may be removed under reduced pressure.

In another embodiment of the present production methods, the second reaction mixture may be stirred at room temperature.

In a further embodiment of the present production methods, the second reaction mixture may be stirred for at least about 8 hours.

In an embodiment of the present production methods, the toluene may be removed under reduced pressure.

In another embodiment of the present production methods, the $Zn(CH_3COO)_2 \cdot 2H_2O$ may be added dropwise to the third reaction mixture.

In a further embodiment of the present production methods, the third reaction mixture may be heated to at least about 80° C.

In an embodiment of the present production methods, the fourth reaction mixture may be heated for at least about 2 days.

In another embodiment of the present production methods, the precipitate is washed with diethyl ether.

The following examples illustrate the present teachings.

Example 1

Synthesis of Zinc Coordination Organoselenium Polymer

To a solution of diselenide 1 (1 mmol) in ethanol (20 ml), NaOH (1 mmol), allyl bromide (2.2 mmol), and NaBH$_4$ (3.5 mmol) were added, and the reaction mixture was stirred at room temperature for 2 hours. The reaction progress was followed by thin layer liquid chromatography (TLC). Upon reaction completion, the solvent was removed under reduced pressure and the residue was dissolved in 20 mL ethyl acetate and extracted with 3×20 mL water. The organic layer was dried and removed under reduced pressure to give amine 4-(allylselanyl)aniline (2 of Scheme 1 above).

To a solution of 4-(allylselanyl)aniline (1 mmol) in toluene (10 mL), maleic anhydride (1.2 mmol) was added, and the mixture was stirred for 8 hours at room temperature. The toluene was removed under reduced pressure and the residue was washed several times with Na$_2$CO$_3$ solution (20%) in water. The formed product 3-((4-(allylselanyl)phenyl)amino)-3-oxopropanoic acid (3 of Scheme 1 above) was dried and used without further purification.

To a solution of compound 3-((4-(allylselanyl)phenyl)amino)-3-oxopropanoic acid 3 (2 mmol) in 20 mL methanol, $Zn(CH_3COO)_2 \cdot 2H_2O$ (2 mmol) dissolved in 60 mL H$_2$O was added dropwise and the reaction was heated at 85° C. for 6 hours. Methanol was removed under reduced pressure and the obtained solid was washed with diethyl ether to give compound zinc complex 4 of Scheme 1 above.

The zinc complex 4 (0.18 mmol) was dissolved in DMF (10 mL) and then benzoyl peroxide (0.09) was added, and the reaction mixture was heated at 80° C. for two days. Cold methanol was then added, and the precipitate was washed with diethyl ether to give the zinc coordination organoselenium polymer (5 of Scheme 1 above).

Molecular weight of the zinc coordination organoselenium polymer 5 up to 94.600 g/mol.

It is to be understood that the zinc coordination organoselenium polymer described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A zinc coordination polymer having the formula I:

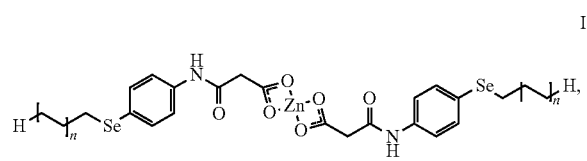

wherein n is 8.

2. The zinc coordination polymer of claim 1, wherein the polymer is a catalyst.

3. The zinc coordination polymer of claim 1, wherein the polymer is a catalyst for biodiesel fuel.

4. A method of making the zinc coordination polymer of claim 1, the method comprising:

adding diselenide in ethanol to NaOH, allyl bromide, and NaBH$_4$ to obtain a first reaction mixture;

stirring the first reaction mixture;

removing ethanol from the first reaction mixture to obtain a first residue;

dissolving the first residue in ethyl acetate and extracting the ethyl acetate with water to obtain an organic layer;

removing the organic layer to obtain 4-(allylselanyl)aniline;

adding toluene and maleic anhydride to the 4-(allylselanyl)aniline to obtain a second reaction mixture;

removing the toluene from the second reaction mixture to obtain a second residue;

washing and drying the residue with Na$_2$CO$_3$ to obtain 3-((4-(allylselanyl)phenyl)amino)-3-oxopropanoic acid;

adding methanol to the 3-((4-(allylselanyl)phenyl)amino)-3-oxopropanoic acid to obtain a third reaction mixture;

adding dissolved $Zn(CH_3COO)_2 \cdot 2H_2O$ to the third reaction mixture;

heating the third reaction mixture;

removing the methanol from the third reaction mixture to obtain a solid;

washing the solid with diethyl ether to obtain a zinc compound;

dissolving the zinc compound in DMF and adding benzoyl peroxide to obtain a fourth reaction mixture;

heating the fourth reaction mixture;

adding cold methanol to the fourth reaction mixture to obtain a precipitate;

washing the precipitate; and obtaining a zinc coordination organoselenium polymer.

5. The method of making the zinc coordination polymer of claim 4, wherein the first reaction mixture is stirred at room temperature.

6. The method of making the zinc coordination polymer of claim 4, wherein the first reaction mixture is stirred for about 2 hours.

7. The method of making the zinc coordination polymer of claim 4, wherein the ethanol is removed under reduced pressure.

8. The method of making the zinc coordination polymer of claim 4, wherein the organic layer is removed under reduced pressure.

9. The method of making the zinc coordination polymer of claim 4, wherein the second reaction mixture is stirred at room temperature for 8 hours.

10. The method of making the zinc coordination polymer of claim 4, wherein the second reaction mixture is stirred for 8 about hours.

11. The method of making the zinc coordination polymer of claim 4, wherein the toluene is removed under reduced pressure.

12. The method of making the zinc coordination polymer of claim 4, wherein the $Zn(CH_3COO)_2 \cdot 2H_2O$ is added dropwise to the third reaction mixture.

13. The method of making the zinc coordination polymer of claim 4, wherein the third reaction mixture is heated at about 80° C.

14. The method of making the zinc coordination polymer of claim 4, wherein the third reaction mixture is heated for about 6 hours.

15. The method of making the zinc coordination polymer of claim 4, wherein the methanol is removed under reduced pressure.

16. The method of making the zinc coordination polymer of claim 4, wherein the fourth reaction mixture is heated at about 80° C.

17. The method of making the zinc coordination polymer of claim 4, wherein the fourth reaction mixture is heated for about 2 days.

18. The method of making the zinc coordination polymer of claim 4, wherein the precipitate is washed with diethyl ether.

\* \* \* \* \*